(12) United States Patent
Bray et al.

(10) Patent No.: US 9,068,583 B2
(45) Date of Patent: *Jun. 30, 2015

(54) SELF-SEALING FASTENER

(75) Inventors: Alan V. Bray, Spicewood, TX (US); Denise Deppe, Austin, TX (US); Gary Schmidt, Austin, TX (US); Leslie Schmidt, legal representative, Austin, TX (US); David J. Irvin, Austin, TX (US)

(73) Assignee: Systems & Materials Research Corporation, Austin, TX (US)

( * ) Notice: Subject to any disclaimer, the term of this patent is extended or adjusted under 35 U.S.C. 154(b) by 683 days.

This patent is subject to a terminal disclaimer.

(21) Appl. No.: 13/287,791

(22) Filed: Nov. 2, 2011

(65) Prior Publication Data

US 2012/0168055 A1 Jul. 5, 2012

Related U.S. Application Data

(63) Continuation-in-part of application No. 12/034,636, filed on Feb. 20, 2008, now Pat. No. 8,092,128.

(60) Provisional application No. 61/529,240, filed on Aug. 30, 2011, provisional application No. 61/409,388, filed on Nov. 2, 2010.

(51) Int. Cl.
*F16B 1/00* (2006.01)
*F16B 19/00* (2006.01)

(52) U.S. Cl.
CPC ............ *F16B 19/008* (2013.01); *F16B 1/0071* (2013.01)

(58) Field of Classification Search
USPC .................................. 411/82, 258, 82.3, 930
IPC ........................................................ F16B 19/008
See application file for complete search history.

(56) References Cited

U.S. PATENT DOCUMENTS

| 2,466,963 | A | | 4/1949 | Patrick et al. | |
|---|---|---|---|---|---|
| 2,666,354 | A | * | 1/1954 | Dim et al. | 411/371.1 |
| 2,775,917 | A | | 1/1957 | Ferguson | |
| 3,225,017 | A | | 12/1965 | Seegman et al. | |
| 3,275,579 | A | * | 9/1966 | Stierli et al. | 523/211 |

(Continued)

FOREIGN PATENT DOCUMENTS

| CN | 101186780 A | 5/2008 |
|---|---|---|
| CN | 101675063 A | 3/2010 |

(Continued)

OTHER PUBLICATIONS

International Search Report from PCT/US2011/058959 dated Jun. 28, 2012, 13 pgs.

(Continued)

*Primary Examiner* — Gary Estremsky
(74) *Attorney, Agent, or Firm* — David D. Griner; Abel Law Group, LLP

(57) ABSTRACT

An apparatus for making and using a fastener suitable for use in airplane manufacture or repair that is coated with a premixed moisture cure sealant. The sealant layer is coated with a frangible moisture barrier that will break apart when the fastener is installed, thus exposing the sealant to a moisture source. Once exposed to moisture, the sealant will begin to cure. Preferred embodiments also provide a premature cure indicator that provides a visual indication that the outer moisture resistant layer has been damaged.

22 Claims, 13 Drawing Sheets

(56) References Cited

U.S. PATENT DOCUMENTS

| | | | |
|---|---|---|---|
| 3,293,977 A | 12/1966 | Dalton et al. | |
| 3,317,461 A | 5/1967 | Pluddemann | |
| 3,397,178 A | 8/1968 | Shackelford et al. | |
| 3,401,146 A | 9/1968 | Kamal et al. | |
| 3,467,544 A | 9/1969 | Marinelli et al. | |
| 3,485,132 A | 12/1969 | Hanny et al. | |
| 3,489,599 A | 1/1970 | Krieble | |
| 3,639,137 A * | 2/1972 | Marinelli | 428/321.5 |
| 3,659,896 A | 5/1972 | Smith et al. | |
| 3,922,449 A | 11/1975 | Bolger | |
| 3,923,748 A | 12/1975 | Hutt et al. | |
| 4,012,984 A | 3/1977 | Matuschek | |
| 4,018,333 A | 4/1977 | Blackwood | |
| 4,059,136 A | 11/1977 | Wallace | |
| 4,092,293 A | 5/1978 | Harris et al. | |
| 4,428,982 A * | 1/1984 | Wallace | 427/202 |
| 4,443,567 A | 4/1984 | Sternisa et al. | |
| 4,519,974 A | 5/1985 | Bravenec et al. | |
| 4,545,712 A * | 10/1985 | Wallace | 411/258 |
| 4,556,591 A | 12/1985 | Bannink, Jr. | |
| 4,609,762 A | 9/1986 | Morris et al. | |
| 4,639,175 A | 1/1987 | Wollar | |
| 4,659,268 A | 4/1987 | Del Mundo et al. | |
| 5,000,636 A * | 3/1991 | Wallace | 411/258 |
| 5,193,958 A * | 3/1993 | Day | 411/82 |
| 5,249,898 A | 10/1993 | Stepanski et al. | |
| 5,304,023 A | 4/1994 | Toback et al. | |
| 5,792,388 A | 8/1998 | Heitz et al. | |
| 6,523,834 B2 | 2/2003 | Philipson | |
| 6,659,699 B2 | 12/2003 | Stoewer et al. | |
| 6,817,076 B1 * | 11/2004 | Stephenson | 29/402.09 |
| 6,868,597 B2 | 3/2005 | Stevenson et al. | |
| 6,953,509 B2 | 10/2005 | Keener | |
| 7,017,255 B2 | 3/2006 | Wang et al. | |
| 7,021,153 B2 | 4/2006 | Almanstoetter et al. | |
| 7,134,666 B2 | 11/2006 | Beyssac et al. | |
| 7,195,437 B2 * | 3/2007 | Sakamoto | 411/82.3 |
| 7,645,840 B2 | 1/2010 | Zook et al. | |
| 7,721,996 B2 | 5/2010 | Gehrett et al. | |
| 7,786,226 B2 | 8/2010 | Cosman | |
| 7,900,412 B2 | 3/2011 | West et al. | |
| 8,092,128 B1 | 1/2012 | Bray et al. | |
| 2005/0148741 A1 | 7/2005 | Zook et al. | |
| 2006/0141242 A1 | 6/2006 | Keener | |
| 2008/0080954 A1 | 4/2008 | Snow et al. | |
| 2008/0221238 A1 | 9/2008 | Su et al. | |

FOREIGN PATENT DOCUMENTS

| | | |
|---|---|---|
| FR | 2064220 | 7/1971 |
| GB | 1253020 | 11/1971 |
| JP | 02036220 | 2/1990 |

OTHER PUBLICATIONS

Lakshmi N. Sridhar, Gupta, K. Rakesh, and Bhardwaj, Mohit, Barrier Properties of Polymer Nanocomposites, Feb. 18, 2006, pp. 8282-8289, vol. 45, Ind. Eng. Chem. Res.

Leslie, J. Clark and Michael A. Cosman, Use of Permapol P3.1 polymers and epoxy resins in the formulation of aerospace sealants, International Journal of Adhesion & Adhesives, 2003, pp. 343-348, vol. 23.

Glass, Richard S., A facile Synthesis of Trimethylsilyl Thioethers, Journal of Organometallic Chemistry, 1973, pp. 83-90, vol. 61.

* cited by examiner

SELF-SEALING FASTENER

STATEMENT REGARDING FEDERALLY SPONSORED RESEARCH OR DEVELOPMENT

This invention was made with Government support and the Government has certain rights in the invention.

This application claims priority from U.S. Provisional Application 61/529,240, file Aug. 30, 2011, and claims priority from U.S. Provisional Application 61/409,388, filed Nov. 2, 2010, and is a Continuation-in-part of U.S. Non Provisional application Ser. No. 12/034,636, filed Feb. 20, 2008, all of which are hereby incorporated by reference.

TECHNICAL FIELD OF THE INVENTION

The present invention relates to fasteners, such as rivets and bolts, that are self-sealing as installed, more specifically to fasteners for use in aerospace manufacture and repair.

BACKGROUND OF THE INVENTION

In many aerospace applications, particularly airplane manufacture, whenever a rivet or other fastener will be installed in an assembly, a sealant must be applied around the fastener at the same time. Currently, aircraft sealants are two-part sealants that need to be mixed accurately and used within a certain amount of time. The mixed sealant is hand applied to fasteners and the "wet" fasteners are then installed. Excess sealant is wiped off and disposed of along with unused sealant.

The labor spent applying sealant to rivets and fasteners in aircraft manufacture and repair is a significant cost and time factor. To put the wasted time and effort into perspective, the C-17, the largest military aircraft currently in production, has over 1.4 million rivets and fasteners in each aircraft. It is estimated that there are on the order of tens of millions of wet installed fasteners going into military and commercial aircraft per year. Eliminating or greatly reducing the labor spent in wet fastener installation could save tens of thousands of labor hours and millions of dollars on the manufacture of just one C-17 aircraft, for example. The case is the same with commercial aircraft platforms such as, for example, the Boeing 747 or Airbus A380.

In addition, the process variability associated with "wet" installations is large. The amount of sealant applied, and areas of the rivet/fastener coated or uncoated vary widely with the installer. Excess sealant is often applied, resulting in additional time and expense for cleanup of the excess sealant. Further, prior art wet installation creates hazardous waste disposal problems because excess and unused sealant often contains toxic materials such as Chromium.

A number of attempts have been made at developing automated or semi-automated methods for coating rivets and fasteners over the past 30 years, but all were either unsuccessful or suffer from significant shortcomings.

An improved fastener for use in airplane manufacture was described by Bray et al., in "Self-Sealing Fastener," U.S. patent application Ser. No. 12/034,636 (filed Feb. 20, 2008) (hereinafter "Bray '636"), which is incorporated herein by reference. While the fastener design described in Bray '636 does represent a significant improvement over the prior art, there are a number of areas in which additional improvements are desirable, especially in areas that are significant from the standpoint of commercial viability.

SUMMARY OF THE INVENTION

An object of the invention, therefore, is to provide a fastener suitable for use in airplane manufacture or repair that does not require the expensive, wasteful, and time-consuming wet installation methods presently in use. A fastener according to a preferred embodiment of the present invention is coated with a pre-mixed moisture cure sealant. The sealant layer is coated with a frangible moisture barrier that will break apart when the fastener is installed, thus exposing the sealant to atmospheric moisture or moisture from some other moisture source. Once exposed to moisture, the sealant will begin to cure. Preferred embodiments also provide a visual indication if the fastener's moisture barrier or capping agent has been damaged.

The foregoing has outlined rather broadly the features and technical advantages of the present invention in order that the detailed description of the invention that follows may be better understood. Additional features and advantages of the invention will be described hereinafter. It should be appreciated by those skilled in the art that the conception and specific embodiments disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more thorough understanding of the present invention, and advantages thereof, reference is now made to the following descriptions taken in conjunction with the accompanying drawings, in which.

The accompanying drawings are not intended to be drawn to scale. In the drawings, each identical or nearly identical component that is illustrated in various figures is represented by a like numeral. For purposes of clarity, not every component may be labeled in every drawing.

DETAILED DESCRIPTION OF PREFERRED EMBODIMENTS

Figure 1:
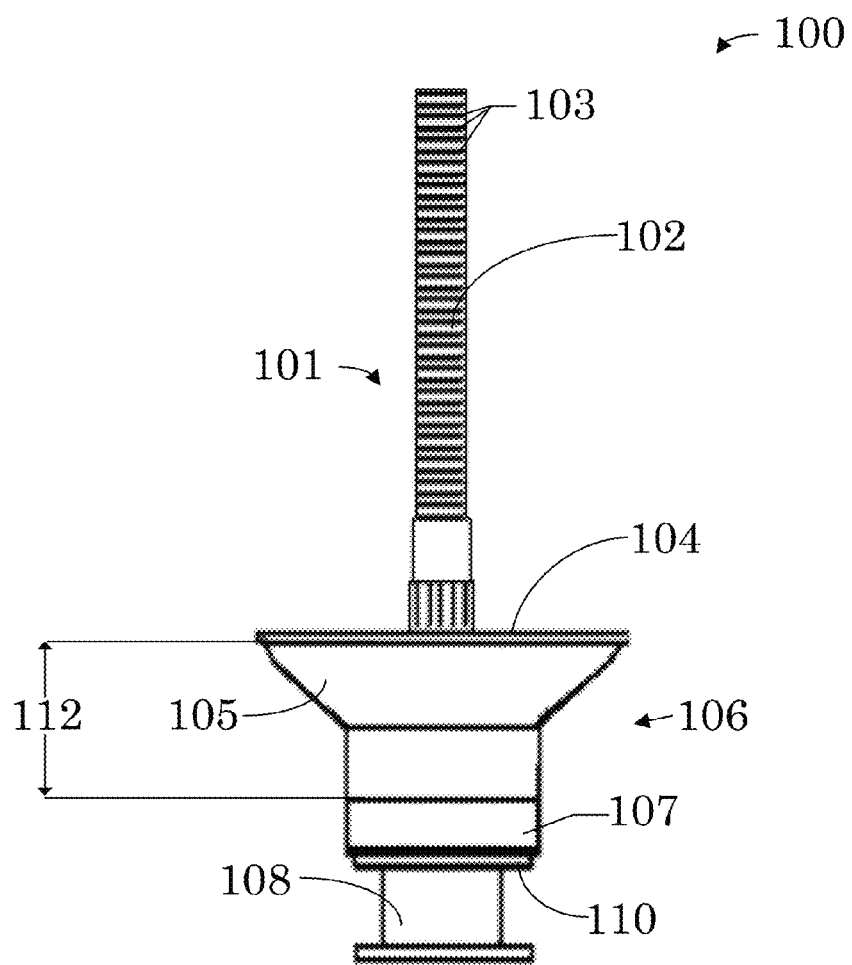
FIG. 1 shows a typical prior art aerospace fastener.

Preferred embodiments of the present invention provide self-sealing fasteners suitable for use in airplane manufacture and maintenance and methods of producing such fasteners. Various efforts have been made to provide self-sealing fasteners or other methods of sealant application to replace the expensive, wasteful, and time-consuming wet installation methods presently in use. But the present inventor is not aware of any commercially successful self-sealing fasteners that have the sealant properties required by airframe assembly and repair. Accordingly, the present invention is believed to satisfy a long-felt need in the aerospace industry.

A fastener according to a preferred embodiment of the present invention is coated with a pre-mixed sealant, which preferably cures in the presence of moisture. The sealant layer is then coated with a frangible moisture barrier. Upon fastener installation, for example into a predrilled hole in a workpiece, the moisture barrier will break in at least one location and/or break apart preferably into two or more pieces, thus exposing the sealant to a moisture source such as atmospheric or non-atmospheric moisture. The installation process will cause the sealant on the fastener to spread out between the fastener and the workpiece. Once exposed to moisture, the sealant will cure and form a seal between the fastener and the workpiece. As used herein, a moisture source can include any fluid containing water, such as moisture readily available in the atmosphere, in an applied gas, or through some other as non-atmospheric moisture source such as a liquid containing water. Once exposed to moisture, the sealant will begin to cure. A preferred moisture barrier will break apart upon installation to allow moisture to reach the sealant.

The use of self-sealing fasteners according to some embodiments of the present invention could result in a tremendous savings of time and costs associated with aircraft manufacture and repair. Preferred embodiments also include an indicator that provides a visual indication that the outer moisture-resistant layer has been compromised which could result in premature cure of sealant prior to installation.

As used herein, the term "frangible" will be used to describe any such breakable moisture barrier. In some embodiments the barrier coat will break into two or more large "chunks," while in other embodiments the barrier may break into multiple pieces, including pieces small enough to appear pulverized. Further, in some embodiments the moisture barrier "chunks" may remain at least partially attached to each other as long as the moisture barrier breaks apart sufficiently to allow moisture to reach the sealant. Preferably, however, the frangible moisture barrier will be extruded from around the fastener head as the fastener is installed. By "extruded," as the term is used herein, it is meant that the barrier layer material will be forced out from around the fastener head as the fastener is installed, rather than remaining in the sealant area between the fastener and the workpiece. In preferred embodiments, the frangible moisture barrier will not break into pieces that are small enough as to mix with the sealant, but will instead break into two or more larger "chunks" to be extruded from around the fastener head. To this end, it is preferable that a majority (more than 50%) of the moisture barrier material will be extruded from around the fastener, therefore not mixing or remaining in the sealant area between the fastener and the workpiece. As discussed below, it is more preferable that greater than 75% of the moisture barrier will be extruded.

A preferred method or apparatus of the present invention has many novel aspects. Because the invention can be embodied in different methods or apparatuses for different purposes, not every aspect need be present in every embodiment. Moreover, many of the aspects of the described embodiments may be separately patentable. The figures described below are generally schematic and do not necessarily portray the embodiments of the invention in proper proportion or scale. Further, although much of the description below is directed at rivet-type fasteners, the present invention could be applied to any type of fastener that must be sealed before installation, including, for example, deformable rivets, blind rivets, screws, threaded bolts, nuts, nut plates, bushings, spacers, washers, faying surfaces, rivets, and clamps.

FIG. 1 shows a typical prior art fastener used for aircraft construction and repair. Such fasteners are described, for example, in U.S. Pat. No. 4,012,984, which is hereby incorporated by reference. The uninstalled blind rivet assembly 100 shown in FIG. 1 consists of a hollow tubular sleeve with an enlarged rivet head 105 on one end and a tail portion 107 on the other end. Rivet stem 101 extends through sleeve 106 and has an upper pulling portion or mandrel 102 and a lower stem tail portion 108. The distance shown by reference number 112 represents the maximum grip of the fastener. The total thickness of the plates or other workpieces to be fastened together must be less than distance 112. The grip varies depending upon the length and type of fastener used.

Figure 2:
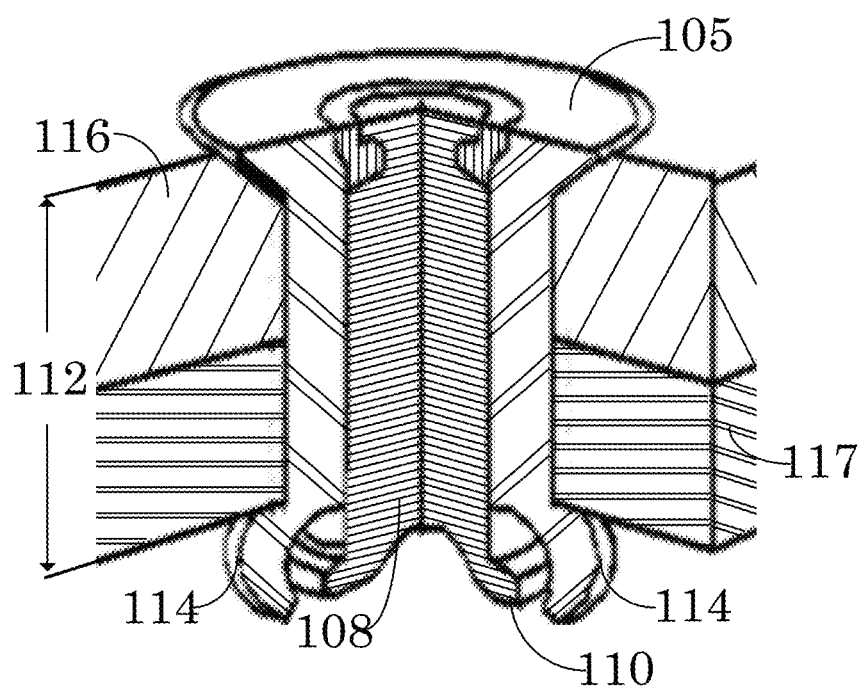
FIG. 2 shows a cross section of an installed prior art rivet-type fastener.

These types of rivet fasteners are often used to hold two metal plates or two pieces of sheet metal together as shown in FIG. 2. As discussed above, when this type of fastener is used in aerospace applications, the outer sleeve of the rivet must be coated with a mixed sealant (typically by hand). The coated rivet is then inserted into a drilled (and in this case countersunk) hole through the two plates 116 and 117 an installation tool (not shown) is slipped over the mandrel 102 so that the installation tool's pulling head can grip the serrations 103 on the mandrel 102. With the installation tool pushing down against a removable washer or anvil 104 on top of the rivet head 105, the tool then begins to pull the rivet stem 101 upward. As the stem is pulled upward, the stem shear ring 110 located on the stem tail portion is pulled against the tail portion of the rivet sleeve. Referring also to FIG. 2, this causes the sleeve tail portion 107 to buckle and form an expanded bubble 114, which presses against the underside of the plates 116 and 117 to hold the rivet in place and to cinch the plates together. Continued pulling by the installation tool causes the mandrel 102 to fracture and break away, leaving the rivet head 105 flush with the upper surface of the top plate. A cross section of an installed rivet is shown in FIG. 2. When the sealant-coated rivet is installed, sealant should be seen extruded out from under the entire periphery of the rivet head to insure that there was adequate sealant coverage.

A. Sealant

As described in Bray '636, aerospace fasteners such as the rivets shown in FIGS. 1 and 2 are coated with a pre-mixed layer of a one-part sealant, which preferably cures in the presence of moisture. Preferred sealants are thiol-functional polymers such as polysulfides or polythioethers. The present invention can make use of any one-part moisture-curing polymer that has the characteristics required for use as an aerospace sealant.

Aerospace sealants are normally two-part, room temperature vulcanization (RTV) materials where the product is mixed, applied, and allowed to cure under ambient conditions. As used herein, the term "ambient conditions" refers to the conditions typically present in an airplane manufacturing facility. In a two-part sealant, the first part (usually referred to as "part A") typically consists of the curing polymer (such as liquid polysulfide) along with various fillers, plastisizers, adhesion promoters, etc. The second part (Part B) contains the curing agent along with accelerators/retarders to speed up or slow down the curing process, colorants to help visually determine whether mixing is complete and other various fillers and plastisizers. Once the two parts have been thoroughly mixed together, the cure process is started and the sealant will begin to harden.

Although one-part sealants are known, in most aerospace applications two-part sealants are used because of their better storage stability and superior curing properties. In a one-part sealant, the curing polymer and the cross linking (curing) agent which are necessary for curing are stored in the same container, but the curing process does not start until the composition is exposed to moisture.

One-part moisture curing polysulfide sealants are known and are available, for example, from W.R. Meadows under the brand name "Seal-Tight." However, no one-part moisture curing sealants are currently approved for use as an aerospace fastener sealant. Aircraft manufacturing, whether military or civilian, requires adherence to strict standards and certifications. Standards are set forth by industry recognized professional organizations (e.g. National Aerospace Standard (NAS) or SAE International) or are established by the Department of Defense or industry leaders. The certification process for new sealants can be very lengthy and expensive. For this reason, it is desirable to use sealants that are already approved for aerospace use, such as sealants meeting the AMS-3276 standard (for fuel tank and general use sealant compounds), the AMS-3277 standard (for fast-curing polythioether sealing compounds, or the AMS-3281 standard (for polysulfide sealing compounds). These standards are available from SAE International and are incorporated by reference.

Sealants currently in use in airplane manufacturing that meet these standards are two part sealants. Accordingly, it is preferable to convert these existing two-part sealants to a one-part sealant for use in the present invention. Thiol-terminated sulfur-containing polymers are known to be well suited for use in aerospace sealants due to their fuel resistant nature upon cross-linking. A number of known and widely used two-part thiol-terminated polymers can be converted to one-part sealants by using the silylation process described below.

For example, probably the most common fastener sealant used in aerospace applications is liquid polysulfide. The general structure of the liquid polysulfide polymer is: HS—(C2H4-O—CH2-O—C2H4-S—S)n-C2H4-O—CH2-O—C2H4-SH. The value of the repeat unit n, which is generally in a range of 5 to 50, governs the viscosity of the polymer. Two-part polysulfide polymers typically use oxygen-donating materials such as manganese dioxide ($MnO_2$) to effect a cure. The curing agent surrenders oxygen, which reacts with the terminal thiol (—SH) groups of the polysulfide polymer. The curing mechanism can be expressed as:

2-R—SH+O→—R—S—S—R—+H$_2$O

A suitable polysulfide polymer for use in the present invention is PR1776, available from PRC-DeSoto International.

Polythioether polymers are also widely used in aerospace applications. Like polysulfide polymers, polythioethers have functional thiol (—SH) groups that can react with a curing agent, especially an epoxy resin, to cure the polymer. An example of a suitable polythioether polymer for use in the present invention is Permapol® P3.1 (which is used in PR2001B sealant) available from PRC-DeSoto International. The general structure of the P3.1 polythioether is:

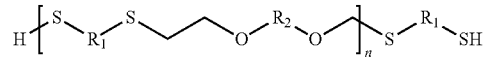

The reaction of the thiol-terminated polymer with an epoxy resin can be expressed simply as:

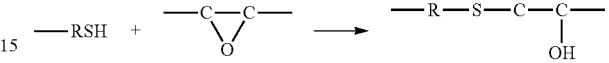

In order to use a thiol-terminated polymer, pre-polymer, or oligomer—such as a polysulfide or a polythioether polymer—as a one-part sealant according to the present invention, it is first necessary to cure-block the polymer to prevent it from curing in the presence of the appropriate curing agent. A preferred method of cure-blocking either of these thiol-terminated polymers is to use a silylation process that blocks the reactivity of the thiol functional group with a silicon containing molecule. The polymer resin (either a polysulfide or a polythioether) is combined with a silylating agent such as hexamethyl disilazane (HMDS) in the presence of imidazole and heated to 150° C. in an inert atmosphere for 6-8 hours. The reaction produces ammonia ($NH_3$) and a trimethylsilyl thioether-terminated polymer where the —SH groups of the original polymer have been replaced with —S—Si—$(CH_3)_3$.

Figure 3:
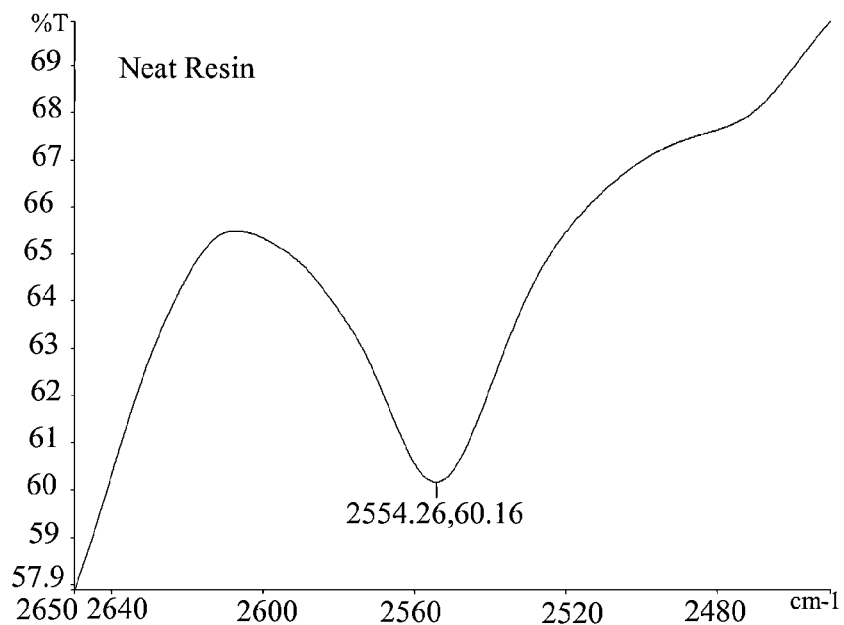
FIG. 3 shows an IR spectrum of neat polythioether resin.
Figure 4:
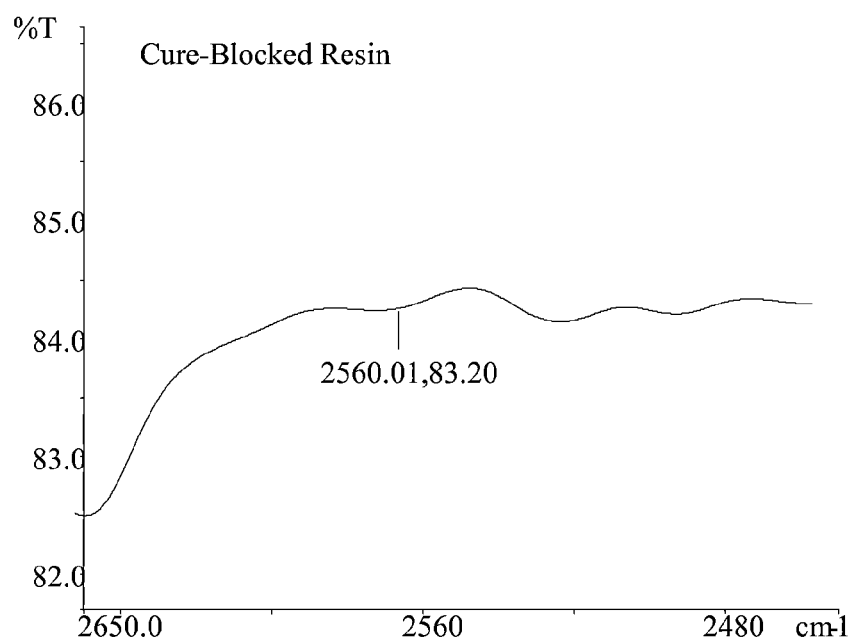
FIG. 4 shows an IR spectrum of silylated polythioether resin.
Figure 6:
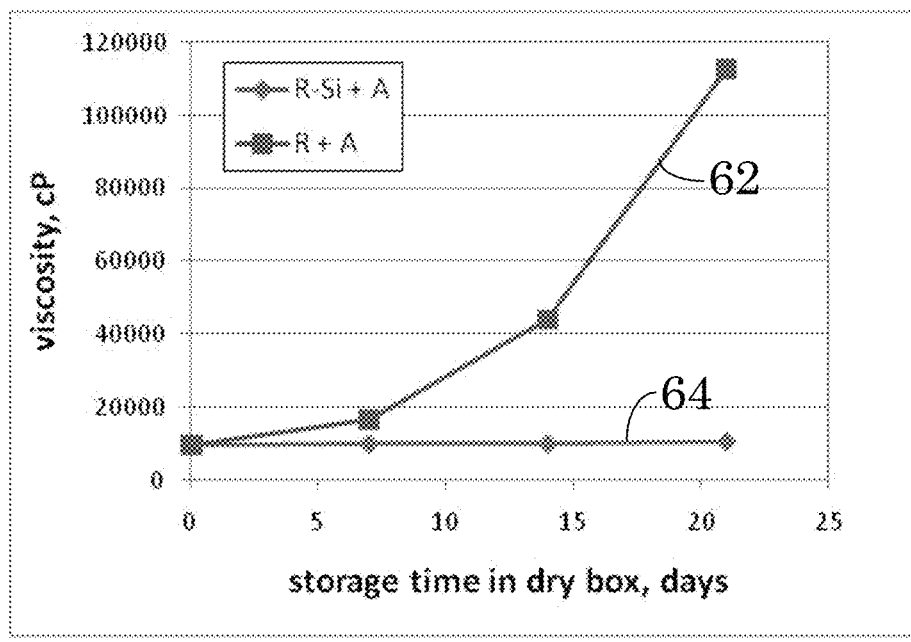
FIG. 6 shows a graph comparing elapsed storage time to viscosity for unblocked resin combined with the curing agent and for the blocked resin combined with the curing agent.

IR Spectroscopy can be used to confirm the blocking reaction. For example, the IR spectrum of the neat PR2001B polythioether shown in FIG. 3 shows a pronounced peak corresponding to the presence of the thiol group. After silylation, however, the IR spectrum of FIG. 4 shows that the thiol peak has disappeared due to the replacement of the active thiols with trimethylsilyl groups. Similar spectra can be observed for the neat and silylated polysulfide resins showing that the polysulfide thiol group is also replaced during silylation. For both polymers, silylation blocks the curing reactions discussed above. As a result, the blocked polymers can be mixed with the appropriate curing agent (MnO2 for the polysulfide or epoxide for the polythioether) without curing. This is confirmed by the table shown in FIG. 6 which compares elapsed storage time to viscosity for unblocked resin combined with the curing agent (shown by line 62) and for the blocked resin combined with the curing agent (shown by line 64). Both were stored in a dry box with only 16-20 ppm $H_2O$. At 20 days, the blocked resin and curing agent combination still maintained a low viscosity (no curing) while the combined unblocked resin was completely cured.

Figure 5:
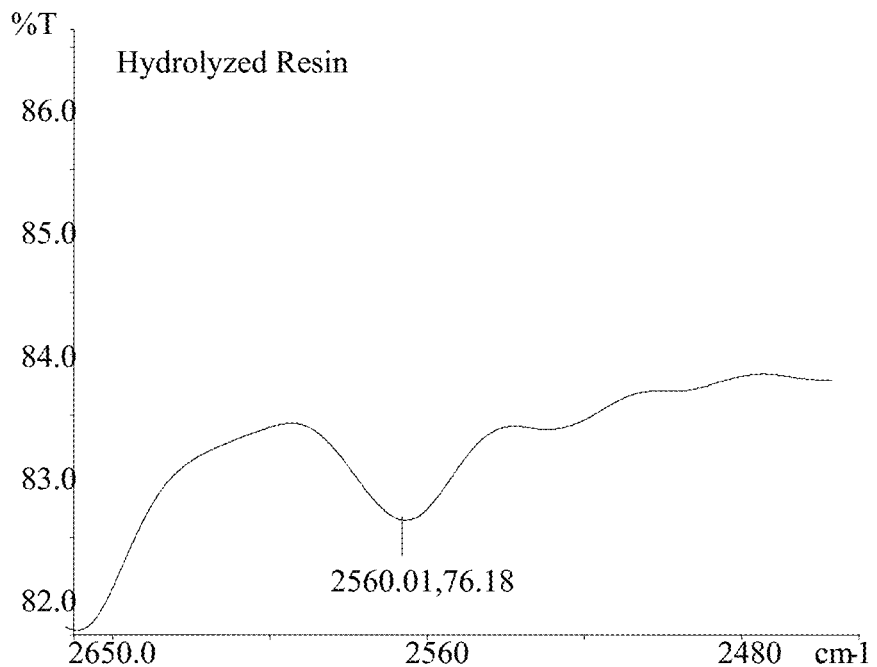
FIG. 5 shows an IR spectrum of hydrolyzed polythioether resin.

The —S—Si—chemical bond can be easily cleaved by hydrolysis upon exposure to even small amounts of $H_2O$. On contact with moisture, even the small amount of moisture present in ambient air, the trimethylsilyl group will be replaced by the original thiol (—SH) group. The IR spectrum in FIG. 5 shows a silylated resin that has been exposed to atmospheric moisture. When compared to FIGS. 3 and 4, it can be seen that the peak corresponding to the thiol group has reappeared in FIG. 5 upon the hydrolysis of the trimethylsilyl-blocking group. Once the blocking group is cleaved by exposure to moisture, the functionality of the thiol groups is restored and the thiol groups will react with the curing agent in the mixture to cure the sealant.

Preferably, the blocking group used to provide for moisture cure comprises a silane group with three alkyl or aryl pendent groups including but not limited to methyl, ethyl, isobutyl, phenyl, benzyl, or trimethyl silyl. By varying the group, the stability of the resin and the cure rate can be modified. The pendent groups on the silane need not be identical (e.g., ethyldimethylsilyl). While the use of an appropriately substituted disilazane to carry out the thiol protection step is preferred due to the extrusion of gaseous ammonia as the only byproduct, there are other methods of production. Other methods for the production of a silyl blocking group include the use of other silylating agents such as the chlorosilane (i.e. triisopropylsilyl chloride), which produces corrosive chloride that must be removed via an extra purification step; the allylsilane (i.e. allyltrimethylsilane), which produces volatile propene gas; and the carbamate (i.e. N,O-bis(trimethylsilyl)carbamate), which produces CO2 and ammonia gasses. It should also be noted that silyl capped thiols can be made to react with an epoxy resin directly without loss of the silyl group by using an appropriate catalyst such as compounds producing fluoride ions and cyanide ions.

Persons of skill in the art will recognize that other blocking agents could be used in some situations to achieve the same moisture sensitive blocking, including for example carboxylic acid, tetrahydropyran or furan, methoxyethoxymethyl or similar moisture labile groups. A problem with the sealants described by Bray '636 is the varying rate of hydrolysis and controlling the shelf life. Other preferred blocking agents with a more stable shelf life include THP (tetrahydropyranyl), TMS trimethylsilane, TES triethyl silane, 3-nitro-2-pyridyl sulfenyl, S-sulfonate, trans-beta nitrostyrene, and propionitrile. When blocking the thiol with groups other than silyl groups, the stability of the resulting protection can be enhanced. For example when using the tetrahydropyranyl (THP) group, the group is added by addition to the thiol with an acid catalyst and is removed by the same base used to cure the final resin. In the case of the 3-nitro-2-pyridyl sulfenyl group, the thiol adds with or without a catalyst but is removed by a base. Analogously, both trans-beta nitrostyrene and propionitrile react with the thiol without a catalyst and are both removed by base.

There are 5 classes of thiol protection: Thioether derivatives, including thiosilyl ethers, thioester derivatives, disulfides, and salts. Usefulness of thioethers and disulfides would be limited for this application of the present invention since removal of these capping agents requires harsh conditions, including the use of strong acids, strong oxidizing agents, ammonia, and mercury salts. One exception to the above statement is the tetrahydropyranyl (THP) ether. The thiosilyl ether class involves the silylation of the thiol. Potential issues with using thiosilyl ether include possible reaction of capped thiol with epoxy curing agent, and early hydrolysis. Thiosilyl ethers other than the trimethyl silane (TMS) claimed in Bray '636 will eliminate the direct reaction stated above. Thioesters cap the thiol with a carboxylic acid, carbonate, or carbamate. Most thioesters release acids when the capping agent is removed, with the exception of carbonate, which releases $CO_2$, which may cause foaming and requires harsh conditions for removal. The salts class includes, but is not limited to, SO3 attached to the thiol. The SO3 group is cleaved under basic conditions found in the formulation to form CaSO4, which would act as a neutral filler in the sealant.

In addition to curing via hydrolysis, it is also preferred to use protecting groups that can be hydrolyzed by water in the presence of other chemicals found in the resin. Other chemicals that may be found in the resin and may assist in the hydrolysis of the protecting group include, but are not limited to, a metal oxide like calcium oxide, a metal hydroxide like calcium hydroxide, a metal carbonate like calcium carbonate, tertiary amines like diazabicylcooctane (DABCO) and/or their salts.

Persons of skill in the art will also recognize that it that the assembly or manufacture of the fasteners be preferably performed in a controlled environment. That is, because of the moisture-sensitive nature of the moisture curable sealant, it is preferable that the controlled environment eliminate or reduce the amount of moisture present during fastener manufacture. As discussed below, during the fastener manufacturing process it will typically be necessary to apply the sealant to the fastener first, and then overcoat the sealant with the moisture barrier. In some preferred embodiments, the area in which the fastener manufacturing apparatus resides has a moisture-controlled atmosphere so that the uncoated sealant will not begin to cure before the moisture barrier is applied. Dry air stations along the fastener manufacturing assembly could also be used to provide dry air that is piped in through, for example, a manifold so that application of the sealant (and preferably other processes) is performed within an envelope or shield of dry air.

In some preferred embodiments, the shelf life of self-sealing fasteners can be improved by also blocking the catalyst/curing agent. Preferably the curing agent is an amine, more preferably a tertiary amine, and a quaternary ammonium salt can be used to form a blocking group. The quaternary ammonium salt will react with water to liberate free curing agent and can therefore be removed directly by exposure to water or indirectly from humidity in the air. In some embodiments, a filler can be used which, after exposure to water, will react with the blocked curing agent to liberate free curing agent.

B. Moisture Barrier

Once a suitable moisture sensitive cure-block has been effected, and the blocked polymer mixed with the appropriate curing agent, the resulting one-part moisture curing sealant will rapidly "un-block" and cure if exposed to moisture. As a result, it is necessary to protect the sealant from exposure to moisture until the fastener is in place. This is preferably accomplished by coating the sealant with a size coat that functions as a moisture barrier. In a preferred embodiment, the size coat is a protective layer of a polymer or similar material that is tough enough to survive routine handling of fasteners during production and transportation, but able to break away from the sealant upon application of the fastener installation force so that the sealant will be allowed to cure once the fastener is in place. Preferably, the protective layer is brittle or frangible enough that the layer will break apart (preferably into one or more relatively large pieces) upon the application of the fastener installation. In this application, the terms "size coat" and "moisture barrier" will be used interchangeably.

As described in Bray '636, one suitable size coat would be a nanocomposite of polystyrene resin and nanoclay, such as Cloisite® nanoclay commercially available from Southern Clay Products, Inc. Polystyrene alone acts as a moisture barrier, but still allows atmospheric moisture to penetrate. The addition of the nanoclay further slows moisture penetration by creating a "tortuous path" that diffusing water molecules must take to pass through the nanocomposite layer because of the presence of a large number of nanoclay barrier particles. The use of polymer nanocomposites is discussed by Sridhar et al., "*Barrier Properties of Polymer Nanocomposites,*" IND. ENG. CHEM. RES., vol. 45, 8282-89 (2006), which is incorporated by reference. The clay is also anhydrous and absorbs some of the penetrating moisture. A mixture containing about 5% nanoclay can reduce moisture penetration by as much as a factor of 5.

One disadvantage of the use of a polystyrene nanocomposite is that the mixture is typically deposited from a dilute solution and then heated to drive off the volatile solvent. Any heating must be very carefully controlled to avoid any unintentional curing of the one-part solvent underneath the size coat.

In another preferred embodiment, the size coat/moisture barrier is curable by UV or visible light (actinic radiation). A suitable compound would include a polymer nanocomposite composition comprising an acid ester; an acrylic oligomer; a multi-functional (meth)acrylate monomer; and a layered inorganic silicate. By using a UV or visible light curable composition, the problem of heat related premature curing of the sealant is avoided. Additionally, because these compounds are 100% solids (non-solvent based) they can be deposited in a thick layer (as compared to the polystyrene nanocomposite) in one pass. (It should be noted that non-solvent based solutions, which are often referred to as "no-VOCs" or "100% solids," can actually contain up to 1% volatile organic compound). Actinic radiation curing of coatings can occur in less than one second, allowing for extremely rapid manufacture of the present invention. Suitable compositions also maintain the brittleness of the polystyrene nanocomposite so that the polymer nanocomposite composition layer will also fracture under the force of fastener installation.

Suitable acid esters are either a monofunctional acid ester or a trifunctional acid ester, or a mixture thereof. Preferably, the acid ester has an acid number greater than 130 mg KOH/g and less than 195 mg KOH/g, inclusively and is present in an amount from about 5 to about 25 percent by weight.

A suitable acrylic oligomer would be, for example, epoxy acrylate, urethane acrylate, polyester acrylate, polyether acrylate, amine modified polyether acrylate, acrylic acrylate, or a combination thereof. Preferably, the acrylic oligomer is present in an amount from about 40 to about 60 percent by weight.

A suitable multi-functional (meth)acrylate monomer would be, for example, 1,12 dodecanediol dimethacrylate; 1,4-butanediol diacrylate; 1,4-butanediol dimethacrylate; 1,6-hexanediol diacrylate; 1,6 hexanediol dimethacrylate; diethylene glycol diacrylate; diethylene glycol dimethacrylate; dipropylene glycol diacrylate; dipropylene glycol dimethacrylate; ethylene glycol diacrylate; ethylene glycol dimethacrylate; polyethylene glycol diacrylate; polyethylene glycol dimethacrylate; 1,3-butylene glycol diacrylate; 1,3-butylene glycol dimethacrylate; neopentyl glycol diacrylate; neopentyl glycol dimethacrylate; cyclohexane dimethanol diacrylate; cyclohexane dimethanol dimethacrylate; ethoxylated bisphenol A diacrylate, trimethylolpropane triacrylate, pentaerythritol triacrylate, pentaerythritol tetraacrylate, and mixtures thereof. Preferably, the multi-functional (meth) acrylate monomer is present in an amount from about 25 to about 40 percent by weight.

A suitable layered silicate would be a phyllosilicate, such as bentonite; vermiculite; montmorillonite; nontronite; beidellite; volkonskoite; hectorite; saponite; sauconite; magadiite; kanyaite; ledikite and mixtures thereof. Preferably, the layered silicate is present in an amount from about 0 to about 12 percent by weight.

Characteristics of the combined compounds for use as a size coat include: fracture toughness; low water transmission (having a low water vapor transmission rate, or "wvtr"); and curability. It is also preferable that the size coat be non-reactive with the base resin or coating.

Regarding low water transmission, because the purpose of the size coat is to prevent moisture from reaching the sealant, it is obviously desirable that a size coat have as low a water transmission rate as possible. Regarding curability, it is preferable that the size coat cure quickly with actinic radiation. The size coat moisture barrier will typically be applied to the fastener as a liquid. As discussed above, a preferred size coat will quickly cure into a solid, moisture-resistant shell to lessen the chance that any moisture will reach the sealant. In preferred embodiments, the size coat can be cured in less than one second when exposed, for example, to actinic radiation. Once cured, a preferred size coat will have moisture (water) transmission rates that are <20 $g/m^2/day$; more preferably water transmission rates that are <11 $g/m^2/day$; more preferably water transmission rates that are <4 $g/m^2/day$; and even more preferably water transmission rates that are <0.1 $g/m^2/day$.

Regarding fracture toughness, it is preferable that the size coat has a relatively high fracture toughness as compared to otherwise suitable size coat materials. In other words, a preferred size coat material with have a relatively high resistance to crack propagation so that it will fracture into fewer pieces when the fastener is installed. The fracture toughness of a material containing a crack is its resistance to fracture from that crack, and is quantified by factor $K_{IC}$. According to preferred embodiments of the present invention, the size coat material should exhibit a fracture toughness $K_{IC}$ in the range of 0.7-1.6. More preferably, the size coat material can be classified by its elongation-to-break value. A preferred size coating would have an elongation-to-break value of between 1% and 15%, preferable between 3% and 8%.

A problem with the fastener of Bray '636 is that the described size coat formulations tend to pulverize (break apart into tiny pieces) when the fastener is installed and the size coat is subjected to stress. This is undesirable in many instances because the tiny pieces of size coat will tend to mix with the underlying sealant. Aircraft sealants are carefully formulated and subjected to intense testing and approval requirements, and allowing the introduction of foreign material into the uncured sealant could potentially cause problems with sealant performance. Even if the foreign materials were eventually found not to cause problems with the sealant, their presence would likely require a substantial and costly re-certification before the use of such fasteners would be allowed. It is also possible that size coat remnants mixed with the sealant could provide a fluid wicking path, which could allow moisture to penetrate the sealant around the fastener.

Figure 9A:
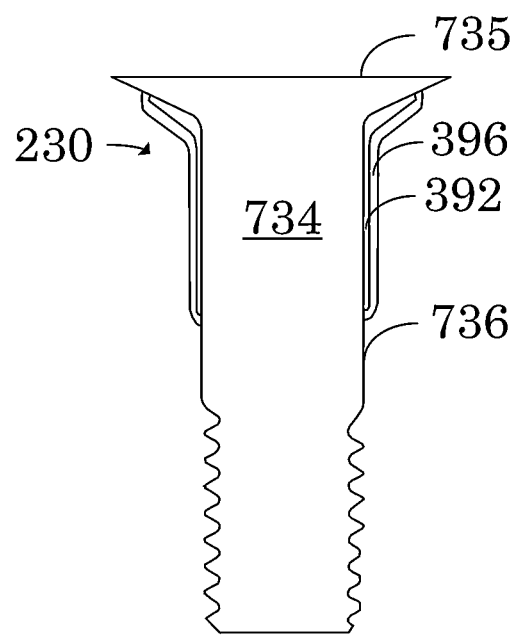
FIG. 9A shows a cross-section view of a typical threaded fastener according to the present invention.
Figure 9B:
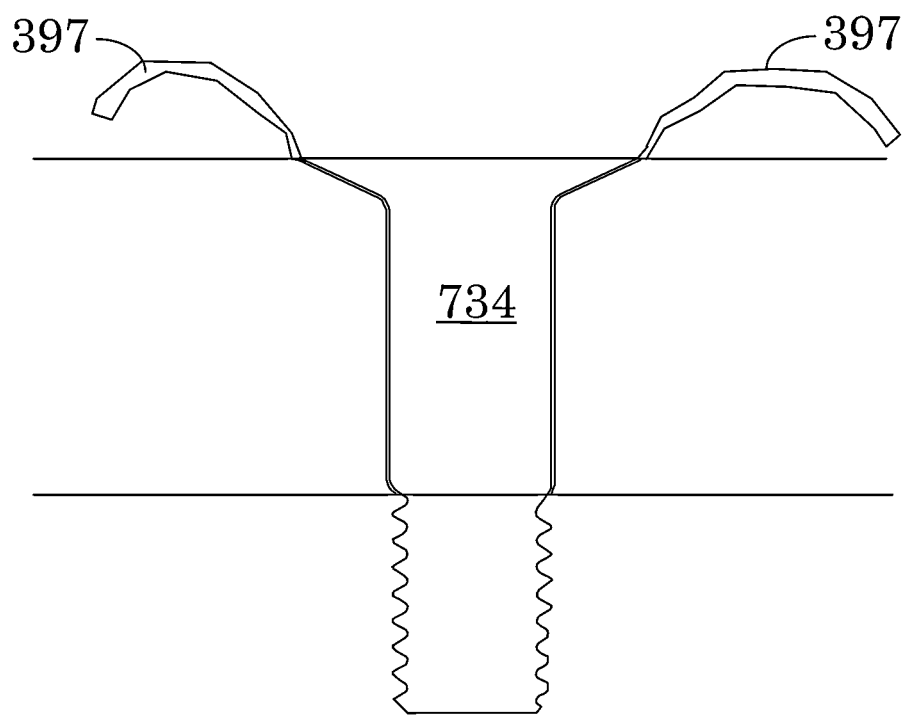
FIG. 9B is a cross-section view of the fastener of 9A with the size coat extruded after installation into a workpiece.
Figure 9C:
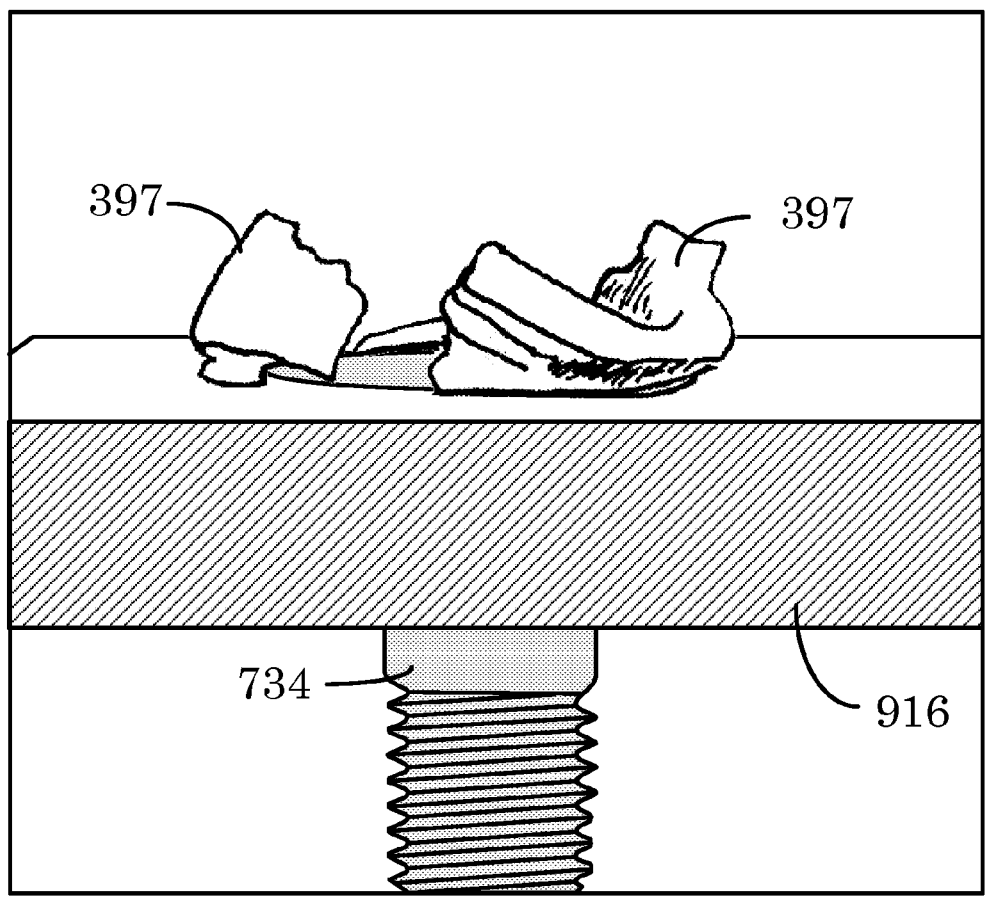
FIG. 9C is a picture showing extruded sealant on the surface of a workpiece around the head of an installed threaded fastener.

As a result, it is highly desirable that the frangible size coat remains largely intact as the fastener is installed so that the coating can extrude around the fastener head in one or more larger pieces rather than breaking apart into several small or pulverized pieces and mixing with the sealant. FIG. 9A shows a typical threaded fastener 734 with a self-sealing coating 230, including sealant layer 392 and size coat 396. FIG. 9B shows an example of size coat 397 extruded from around the fastener head 735 after installation into a workpiece 716, 717. Forming the size coat from a material having a composition of the materials described above in quantities that provide greater toughness to prevent the coating from pulverizing and potentially mixing with the sealant, but will still allow the size coat to break apart into one or more larger "chunks" that will be squeezed up and around the fastener head as the fastener is tightened, is preferred. To facilitate breaking at predetermined places and into predetermined pieces, preferred embodiments may include indentions or scoring on the size coat. In some embodiments, during installation, the size coat may resemble a broken collar having just one fracture instead of several separate pieces. In either case, when this extruding size coat breaks apart and/or is moved away from protecting the sealant, it will still expose the sealant to moisture and the curing process will begin. FIG. 9C is a picture showing extruded sealant 397 on the surface of a workpiece 916 around the head of an installed threaded fastener 734.

Some small amount of the size coat may remain in the fastener hole. However, the large majority of the size coat material will preferably be extruded and will not mix with the sealant in the sealant matrix. In other words, although pieces of extruded size coat may mix with portions of extruded sealant, the portion of sealant between the fastener and the object the fastener is fastened to (referred to as the sealant matrix) preferably has at most only minimal remnants of size coat. In preferred embodiments of the present invention, more than 75% of the size coat will be extruded when the fastener is installed; more preferably more than 90% will be extruded; and even more preferably more than 95% will be extruded. The extruded pieces of size coat, whether mixed or un-mixed with extruded sealant, can then be easily removed during post-fastener installation or clean-up and will preferably not be a part of the remaining sealant joint. Even if the fastener area is not cleaned up after installation, remaining extruded sealant and size coat pieces should not affect the functionality of the sealant for sealing the fastener.

Among the suitable size coat materials described above, a preferred composition of a size coat having preferred values for fracture toughness, water transmission, and curability, could be composed of 25-50% urethane acrylate oligomer, 25-50% isobornyl acrylate, 5-10% monofunctional acid ester, and 1-5% photoinitator. Concentrations within these ranges should be suitable. Persons of skill in the art will be able to optimize concentrations for a particular purpose within these stated ranges without undue experimentation.

C. Premature Cure Indicator

In preferred embodiments, an indicator coating can also be applied underneath the outer size coat to give a visual indication that moisture has penetrated the size coat and thus that the fastener should not be used. Bray '636 described using a moisture sensitive compound which changes color in the presence of moisture, including for example cobalt chloride, which produces a deep red color when exposed to moisture. In some cases, certain moisture indicators may undesirably interact with the sealant and give a false positive color change. For this reason, it is preferable to deposit a very thin size coating over the sealant before the moisture indicator coating is applied.

In practice, it is very difficult to use such a moisture indicator without a very high number of fasteners showing a false positive indication because moisture indicators only indicate the presence of moisture and not necessarily whether the sealant has been un-blocked. Moisture indicators thus do not directly indicate whether a sealant has been un-blocked so that it may cure, but instead only indirectly indicate moisture exposure. Therefore, premature curing, which is a real concern for such self-sealing fasteners, is not directly indicated by moisture indicators. Further, because metal salts, such as chloride salts commonly used as moisture indicators, promote corrosion on some surfaces, such as those of an aircraft, a moisture indicator containing chloride is less desirable than one that does not promote corrosion.

A similar visual indicator that does not promote corrosion can be provided to more directly measure whether the sealant is un-blocked or prematurely cured by using a compound that is sensitive to unprotected thiol groups. As described above, when the reactive thiol groups of the polythioether sealants become "un-blocked" due to exposure to moisture, the sealant will begin to cure. A visual indicator that is sensitive to thiol groups can thus indicate that the sealant has been exposed to moisture and should not be used. A thiol indicating system therefore will not be as prone to false positive or indirect indications as is the case with the moisture indicators described by Bray '636. This type of visual indicator is also more easily calibrated to the onset of sealant cure.

A preferred premature cure indicator is a dye that reacts with an unblocked thiol group but remains unaffected by any of the components of the sealant or barrier coat, including the any water or blocked thiol group present. The preferred reactive dyes in this application contain carbon-carbon double bonds which are conjugated to produce the color of the dye. When the dye reacts with a thiol, its conjugation changes; the wavelength of the energy it absorbs changes, and the compound will change color. The thiol reacts with at least one of the dye's carbon-carbon double bonds, which is then converted to a carbon-carbon single bond. This change in the bond structure changes the color. For this application, the dyes preferably produce a significant color change to the observer (e.g. blue to colorless or green to red). This color change can be observable under illumination by ambient (visible) light or light of other wavelengths such as fluorescent light, for example.

Since salts are known to promote corrosion of the fastener or substrate before or after installation, it is preferable that the dyes used in the present invention do not contain salts. These dyes are also preferably handled and/or dispensed in dry or ambient conditions because it is also preferable that these dyes react with the thiol at room temperatures. These dyes are preferred to react with thiols quickly (<1 hour). Examples of thiol indicators that would be suitable include ortho-substituted maleimide derivatives of boron-dipyrromethene (BODIPY), squarane dyes, xanthene-based dyes, and crystal violet. Other examples of premature cure indicators include molecules designed to cleave in the presence of thiol, in which the leaving group is a fluorophore, an example of which is shown below.

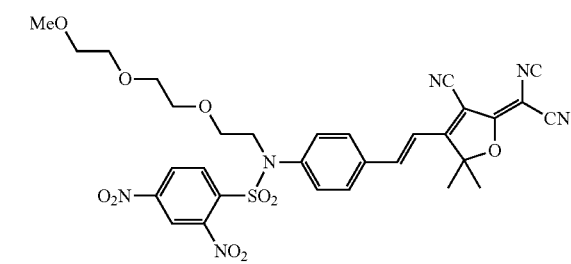

D. Applying Self-Sealing Coating to Fasteners

In combination, the layers discussed above, the sealant, the size coat, and the optional cure indicator layer, can be collectively referred to as a self-sealing coating. As Applicants are using the word "coating" it is understood that in applying such a self-sealing coating the multiple constituent layers may be deposited separately. Also, the constituent layers may be deposited in multiple thinner layers or all at once.

Figure 7A:
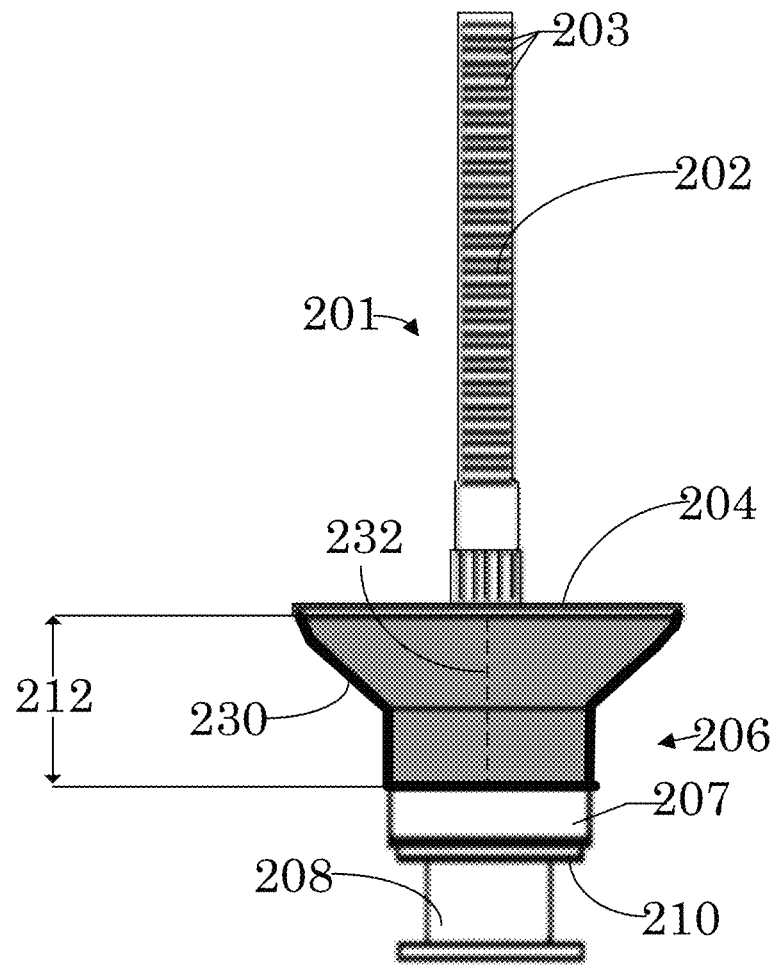
FIG. 7A shows the prior art fastener of FIG. 1 with a self-sealing coating according to the present invention.
Figure 7B:
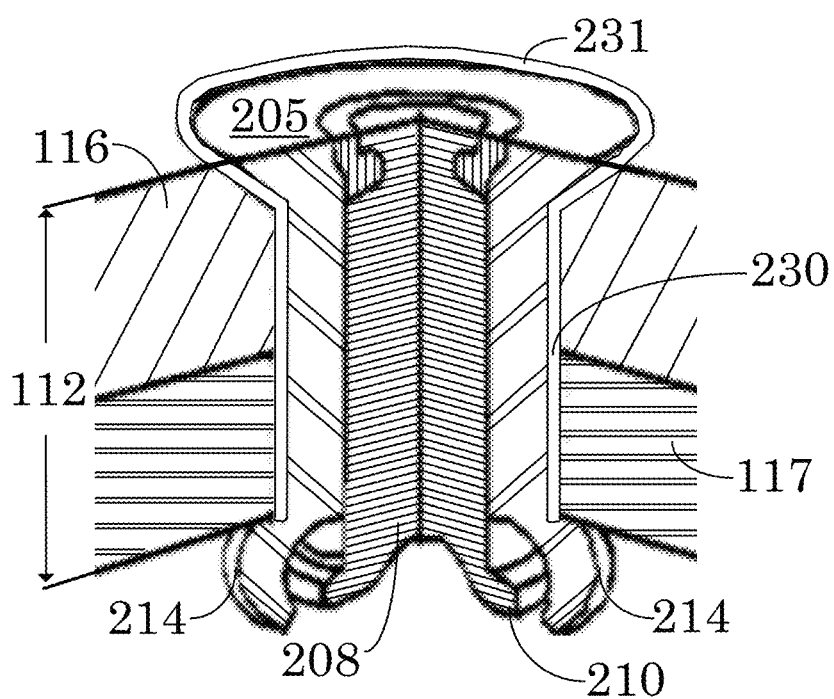
FIG. 7B shows a cross-section view of an installed self-sealing fastener according to the present invention.

FIG. 7A shows a fastener like the prior art fastener of FIG. 1 with a self-sealing coating 230 deposited onto the sleeve 206. FIG. 7B shows a cross-section of the fastener of FIG. 2 to which a self-sealing coating 230 was applied before installation. When the fastener is installed, the coating 230 will preferably entirely cover the portion of the sleeve that will be within the drilled hole in the workpiece (layers 116 and 117) into which the fastener will be installed. In the fastener of FIG. 7A, the self-sealing coating extends the entire grip distance 112 from the top of the fastener head (under the anvil 204) to the lower sleeve tail 207. The coating can also be applied to the portion of the sleeve that will extend below the workpiece for ease of production, but this is not required.

In some embodiments, such as the one shown in FIG. 9A below, the coating 230 may cover a lesser area on the fastener if the sealant layer is thick enough that it will be spread out upon installation to cover the walls of the drilled hole in the workpiece layers. In some preferred embodiments, referring again to FIG. 7A, the coating 230 may include one or more perforations or scores 232 to facilitate breaking of the coating at predetermined locations when installation force is exerted on the coating so that the majority of the moisture barrier will be extruded in one or more larger "chunks" as the fastener is installed.

The entire coating (including the sealant and size coat) is preferably approximately 3 mils (0.003 inches or $7.6 \times 10^{-4}$ mm) thick. More preferably, the sealant layer will be thick enough so that when the fastener is installed, a small amount of sealant will extrude between the fastener head and the upper surface of the top layer 116 (as shown by reference number 231 in FIG. 7B) to give a visual indication that enough sealant is present. Extruded sealant will preferably be visible around the entire circumference of the fastener head. Thicker coatings could be used but would result in material waste and additional cleanup time. As discussed above, the majority of the moisture barrier (not shown) will also be extruded from around the fastener head as the fastener is installed. Fasteners with a self-sealing coating can be installed into pre-drilled holes by any suitable prior art fastener installation means, including standard hand or powered riveters or rivet guns or fully automated riveting machines.

Figure 8:
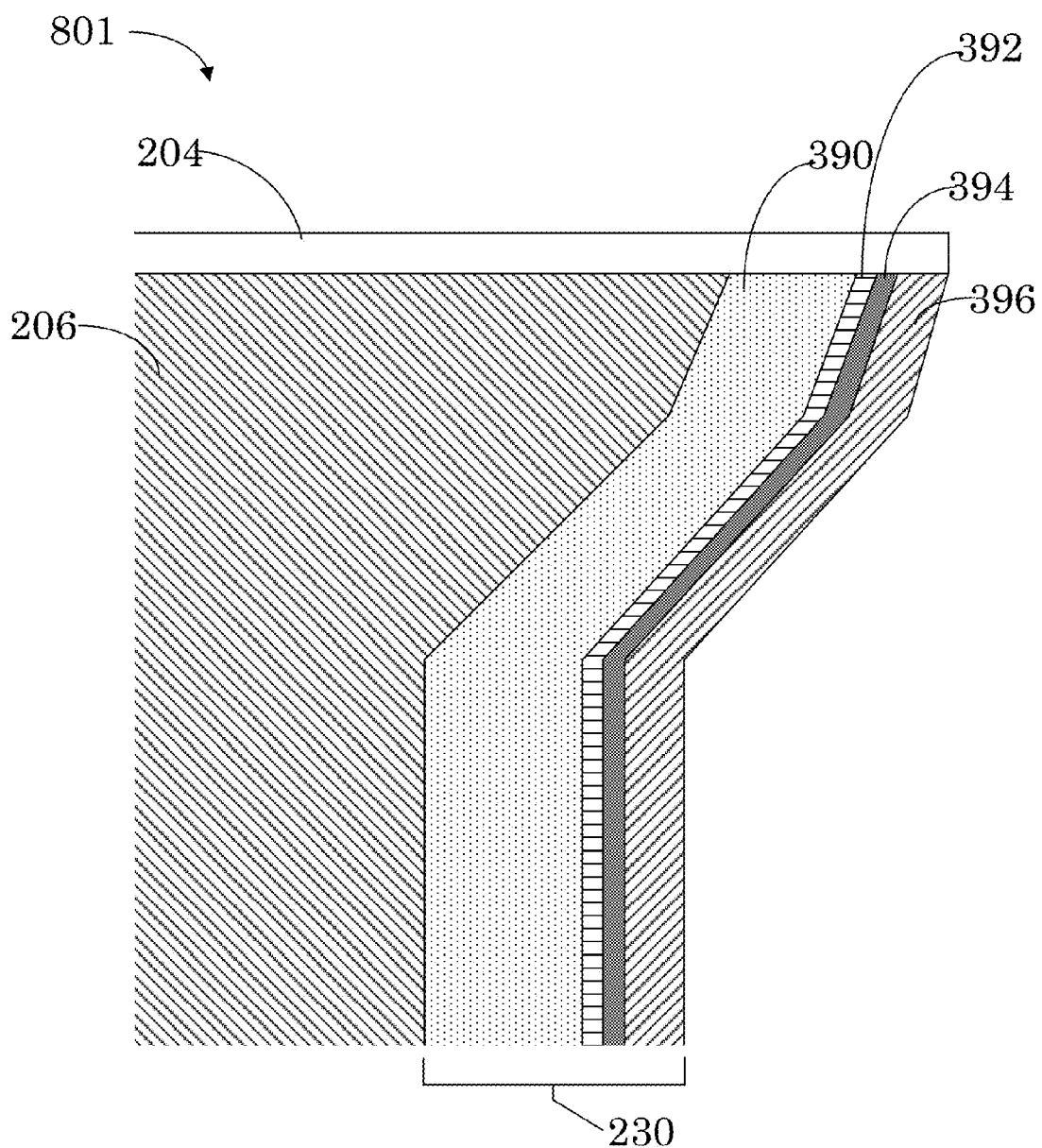
FIG. 8 shows a cross-section view of the self-sealing coating according to the present invention showing the individual layers.

FIG. 8 is a cross-section of the self-sealing coating 230 showing the component layers. In a preferred embodiment, a fastener 801 with self-sealing coating 230 could be produced by applying a suitable one-part moisture curing sealant layer 390, as described in detail above, over at least the grip depth of the fastener. In some preferred embodiments, the deposited sealant layer could be optionally overlaid with a thin size coat 392, followed by an optional coating of a cure indicator 394. The thin size coat layer 392 should be cured without curing the sealant 390 underneath. The sealant 390 (plus the optional cure indicator 394 if desired) is then completely covered with a final size coat 396 such as the polystyrene nanocomposite or UV curable polymer nanocomposite composition described above. The final size coat 396 should also be cured without curing the sealant 390.

To produce fasteners according to the present invention in commercial quantities, each layer can be deposited (one layer at a time) with an electronically controlled fluid dispenser onto fasteners which are chucked into a collet rotating at a designated speed (for example, 100 rpm). In a preferred embodiment of the present invention, the production of self-sealing fasteners can be automated by using a multi-station machine 500, as shown in FIGS. 10-13. Fasteners, such as blind rivets like the one shown in FIG. 1, are added to feeder assembly 502, which is shown in greater detail in FIG. 11. Feeder assembly 502 includes a spiral track 622. Fasteners (not shown) can be loaded, either by hand or from an automated hopper, etc., and can be moved along the track 622 by applied vibration. This causes the fasteners to separate and proceed down the track in single file. At the end of track 622, the fasteners are fed into a slot 626 in track output assembly 624, which separates the fasteners and presents them to the pick-up station 504, which is shown in greater detail in FIG. 13.

Figure 13:
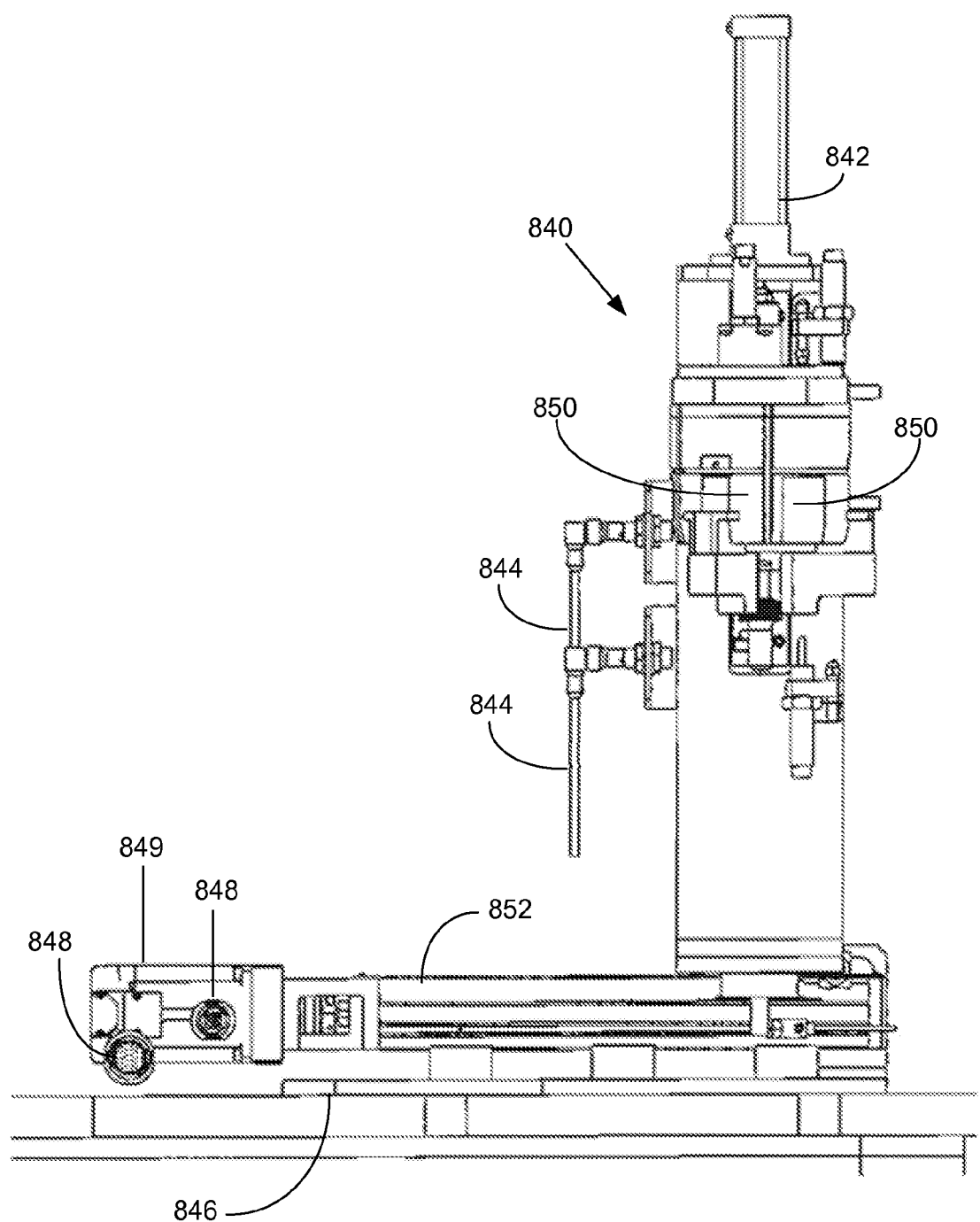
FIG. 13 shows an automated loading assembly for transferring fasteners from the feeder assembly to a collet for processing using the apparatus of FIG. 10.

Referring also to FIG. 13, pick-up station 504 accepts fasteners from feeder assembly 502 and transfers them by way of automated loading assembly 842 to a collet 508 situated on a rotating table 506. Loading assembly 842 preferably makes use of pneumatic jaws 850 that can grip an individual fastener. Other types of known loaders could be used including, for example, those using vacuum tips to hold the individual fasteners. The assembly can then be rotated and/or moved to an appropriate location (for example, along a rail 852) so that the fastener can be transferred to collet 508 for processing. Suitable robotic loading assemblies are known and manufactured, for example, by Nook Industries, Bosch Rexroth, Barnes Automation, and THK.

Figure 12:
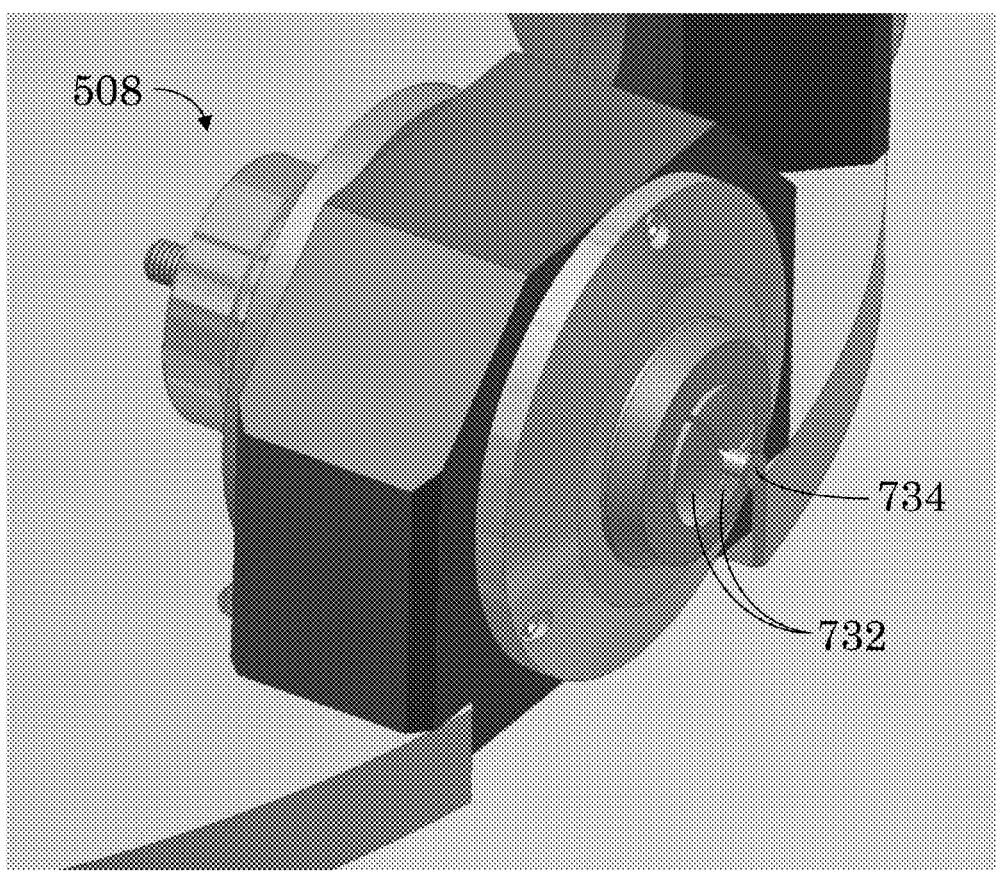
FIG. 12 shows a collet for use with an automated machine capable of producing the self-sealing fasteners of the present invention.

As shown in greater detail in FIG. 12, collet 508 also includes pneumatic jaws 732 that can grip and release a fastener 734. The collet preferably grips the fastener so that a portion of the fastener 734 extends from the collet so that it is exposed for processing. Referring also to FIG. 9A, the head 735 and a portion of the shank 736 of the fastener 734 extends from the jaws of collet 508 so that sealant 392 can be applied to the any location on the shank or head of the fastener. Collet 508 is also preferably capable of rotating the fastener, at a relatively high speed, to assist in the application of the various coatings described below.

Figure 10:
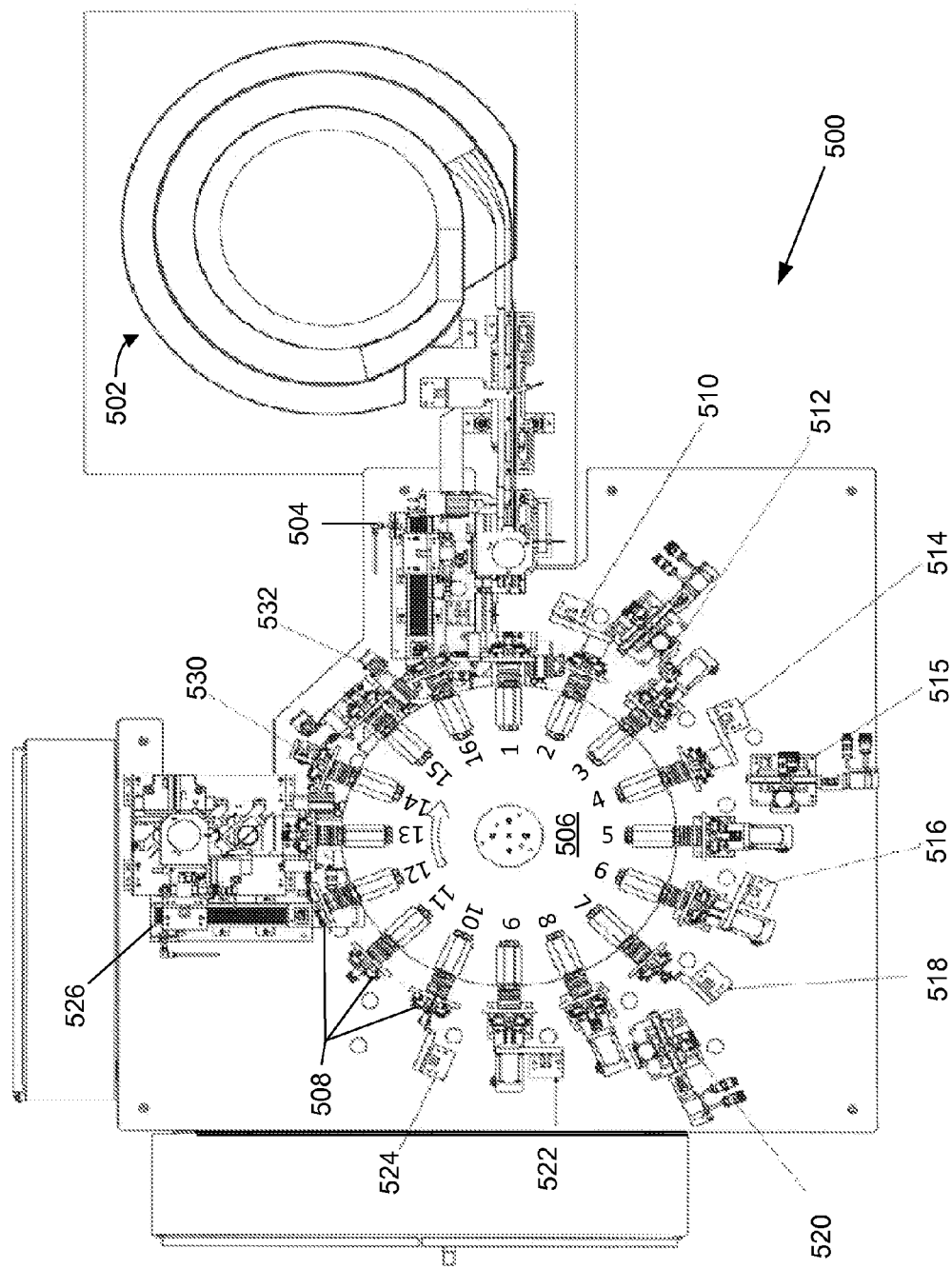
FIG. 10 shows an automated carousel-based multi-station apparatus for producing the self-sealing fasteners of the present invention.
Figure 11:
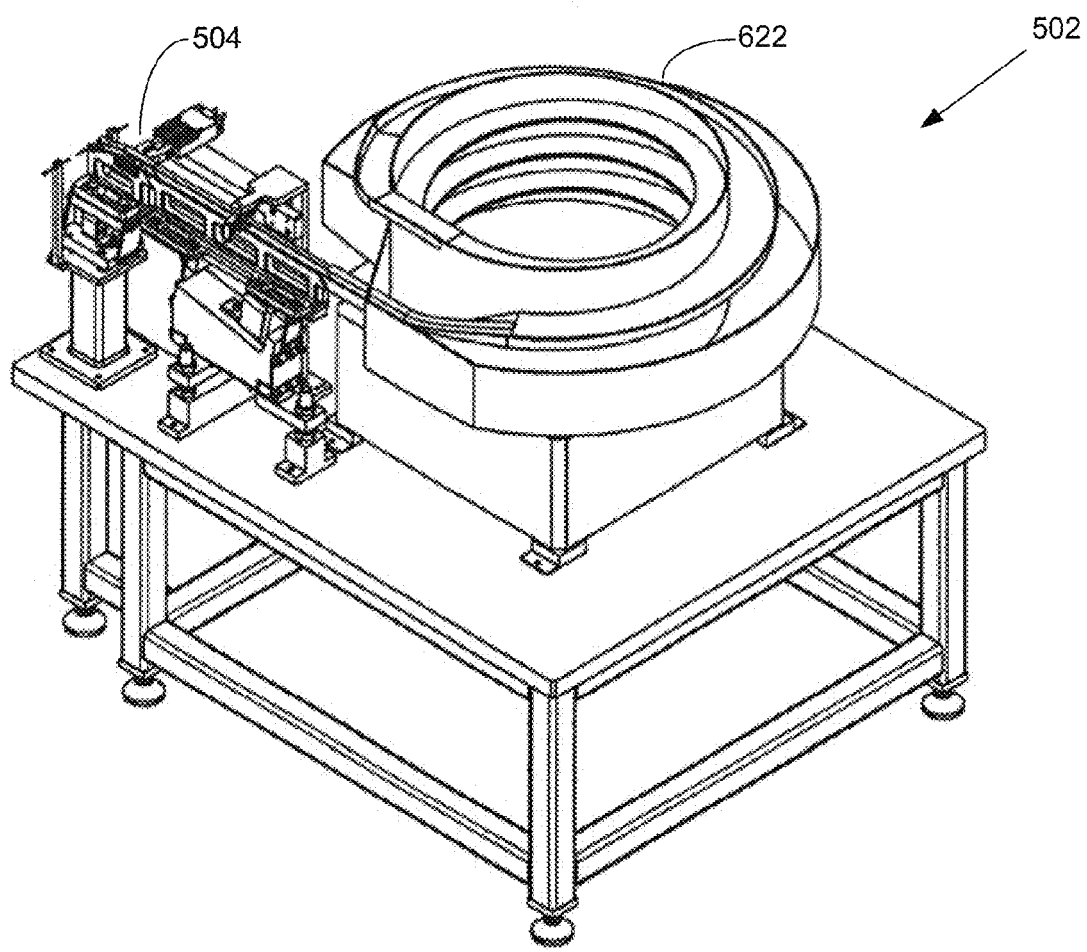
FIG. 11 shows a feeder assembly for feeding fasteners to the automated loading assembly of FIG. 13.

As shown in FIG. 10, a plurality of collets 508 can be mounted on a rotating table 506, allowing the table rotation to move a given fastener to each sequential station for processing. In a preferred embodiment, there will be at least one collet for every processing station so that all processing stations can be operated simultaneously to increase throughput. At each table station, the collet 508 holds the fastener 734 with a portion of the fastener extended toward the processing station for processing. At some stations, the rotation of the collet puts the fastener in position for processing. At other stations, as described in greater detail below, the processing station may be movable (for example forward toward the fastener for processing and then back to allow the collet and fastener to be moved to the next station). Once the processing at a station is completed, the table is rotated so that the collet and fastener are moved to the next processing station. Although FIG. 10 shows a multi-station manufacturing system with sixteen separate collet/fastener positions, the following description will describe the processing steps for a single fastener as it moves successively through positions 1-16.

In the preferred embodiment of FIG. 10, an empty collet is loaded with a fastener at position 1 by loading assembly 504. Once the fastener is loaded, the table rotates to bring the fastener to position 2, where optional quality control station 510 can measure the fastener before processing begins. The station can use, for example, a laser and a detector to determine the exact size of the fastener. The measurement can also be used to determine the amount of sealant to be applied to the fastener or the amount of time during which sealant will be applied to the fastener, taking into account the rotation speed of the collet/fastener. If the fastener size is outside desired size boundaries, the fastener can be discarded rather than processed, while if a fastener is not present the processing steps can skip the particular collet as it proceeds around the table. In some cases, fasteners of different sizes are able to be processed with the present invention in that the difference in size may be compensated for in the following stations of the process. Fasteners which are to be discarded can remain mounted in the collet as it rotates through the stations, but without further processing, and can be discarded once the collet reaches the unloading station described below. This is true for any quality control station throughout the manufacturing process described herein.

After the quality control step is completed, the collet holding the fastener moves to position 3, where a pre-mixed one-part sealant is applied to the fastener. In some preferred embodiments, a two-part sealant can be used, with the two parts mixed before loading into the applicator. In other preferred embodiments, the two parts of the two-part sealer can be stored separately, for example in two separate sealant cartridges, and mixed shortly before application or even at the tip of an applicator needle.

The sealant can be applied to the fastener by, for example, an electronically controlled fluid dispenser 512 which dispenses the pre-mixed one part sealant through a needle tip onto the fasteners, which are rotated by the collet at a designated speed (for example, between 30 and 200 rpm) as the sealant is applied. Based on the measurement dimensions of the fastener determined at station 151, the electronic fluid dispenser 512 might dispense the sealant for a particular amount of time at a particular rotating speed of, for example, 100 rpm. If the fastener is large (having a large circumference) the sealant can be dispensed for a longer period of time or the geometry of the dispensing tip can be changed to keep throughput rates high. On the other hand, if the fastener is relatively small, the sealant is dispensed for a shorter period of time because less time is required to provide the proper amount of sealant. Likewise, if rotation speed is increased, less time is needed for dispensing the sealant, and vice versa. The rotation speed should be fast enough to properly coat the fastener and prevent the applied liquid from dripping off, but not so fast that the sealant will be thrown off by the rotation.

After sealant application, the collet holding the fastener is optionally moved to position 4 where another quality control station 514 can measure the sealant application to ensure that adequate sealer has been applied by, for example, a laser and detector like that used at position 2 to measure the size of the fastener after application or by laser interferometry, ultrasonics, or methods involving microwave radiation which can be used to measure sealant layer thickness. Methods involving microwave radiation may include, for example, those taught by U.S. Pat. No. 6,674,292 to Bray, entitled *Microwave Corrosion Detection Systems and Methods*, which is assigned to the assignee of the present invention, and which is incorporated herein by reference. Fasteners that fail the quality control testing can be discarded as described above.

Fasteners that pass the quality control testing are then moved to position 5 for the application of the Premature Cure Indicator (PCI). The PCI coating may be applied by a fluid dispenser 514 in a similar fashion as that of the sealant application described above, except in that the PCI coating is applied primarily to the sealant layer rather than to the shank of the fastener. As described above, the PCI coating is preferably a compound which changes color in the presence of moisture or, more preferably, thiol groups to provide a visual indication that moisture has penetrated the size coat and thus that the fastener should not be used.

After receiving the PCI coating, the fastener can be moved to position 6 where by curing station 516 can quick-cure the PCI coating, for example, by using UV light or other actinic radiation. Actinic radiation for curing of the PCI coating could be provided by a UV light source that directs UV light at the fastener while the fastener is rotated by the collet, although other types of actinic radiation could be used depending upon the compound used for the PCI coating.

After the PCI coating is cured, the collet holding the fastener can be moved to position 7, where another optional quality control station 518 can measure the fastener as described above to ensure that the fastener is still in place and that the fastener with applied coatings are still within desired parameters (such as overall size, etc.).

Fasteners that fail the quality control testing are discarded, but acceptable fasteners are rotated to position 8 for the application of the size coat. As described above, a suitable size coat will function as a moisture barrier to protect the sealant from exposure to moisture until the fastener is in place. Referring also to FIG. 9A, the size coat 796 may be applied to the fastener by size coat fluid dispenser 520 in the same fashion as the sealant and PCI coatings described above. The size coat should be applied so that the entire sealant/PCI coating is covered by the size coating so that atmospheric moisture can be prevented from reaching the sealant. The desired rotation speed will depend on the amount of sealant to be applied and the thickness/viscosity of the sealant compound.

After the size coat is applied to the fastener at station 8, the table moves the collet holding the fastener to station 9 where curing station 522 for curing of the size coat (for example, using UV light or other actinic radiation) as described above. It is preferable to use a size coat that is curable by actinic radiation rather than heat so that the problem of heat related premature curing of the sealant is avoided. A preferred size coat compound can also be deposited in a sufficiently thick layer (to act as a moisture barrier) in one pass. In some embodiments, the fastener can be rotated after the size coat (or any of the other coatings) is applied to even out the coating using the force of rotation. Air can also be directed at the coating in addition to or instead of the rotation to aid in smoothing out the coating.

The table then moves the collet holding the fastener to station 10 where a final quality control station 524 can optionally be used to verify that the fastener is still in place and within desired measurement parameters. In the preferred embodiment of FIG. 10, the fasteners are not processed at stations 11-12. It should be appreciated that additional processing steps could be added at these stations or additional stations could be added to add additional processing steps to the aforementioned manufacturing process. For example, one or more additional quality control stations could be provided. Additionally, other stations could provide, for example, application of a thin initial size coat before the application of a PCI coating and/or application of scores or perforations to the size coat.

After the processing steps are completed, the table can rotate to station 13 where the finished fastener is offloaded for packaging by unloading station 526. A robotic loading assembly like the one used to initially load the fasteners into the collets, as described above, can be used to remove the fastener (after the collet has released it) and move the coated fastener to a bin or other appropriate container. In some preferred embodiments, the completed self-sealing fasteners could also be off-loaded to additional automated stations for packaging the completed fasteners.

The now-empty collet is then rotated to station 14, where a laser or other detection means 530 could be used to verify that the collet is now empty. Station 15 could be used to provide an optional manual loading station 532. If a fastener is hand-loaded at station 15, the apparatus could be programmed to bypass the automated loading at station 1 as the collet begins to rotate through the stations again. In the embodiment shown in FIG. 10, station 16 is an "empty" station where no processing or loading occurs. As discussed above, however, additional functionality could be added at this station if desired.

Persons of skill in the art will recognize that as a fastener is moved to a subsequent station, another fastener can be loaded into a preceding station. The process can continue until all stations are occupied. Each partial rotation of the table serves to unload a particular fastener and collet from each station and transfer them to the next station. A complete rotation of the table moves a fastener from the initial loading, throughout the complete processing sequence, and to the final unloading of the completed self-sealing fastener. As completed fasteners are offloaded, new fasteners are moved to a first station and the process is repeated. Preferably the multi-station production machine can be calibrated by setting desired fastener spin rates and fluid delivery speeds, adjusting the intensity and time of the cure mechanisms, and synchronizing the self-sealing fastener rate to the packaging feed rate.

Although the description of the present invention above is mainly directed at the installation of fasteners in the aerospace industry, it should be recognized that the invention could be applicable to any industry where sealed fasteners are used, including for example, the construction, automotive, or marine industries. The invention described herein has broad applicability and can provide many benefits as described and shown in the examples above. The embodiments will vary greatly depending upon the specific application, and not every embodiment will provide all of the benefits and meet all of the objectives that are achievable by the invention.

Whenever the terms "automatic," "automated," or similar terms are used herein, those terms will be understood to include manual initiation of the automatic or automated process or step. In the discussion and in the claims, the terms "including" and "comprising" are used in an open-ended fashion, and thus should be interpreted to mean "including, but not limited to . . . ." To the extent that any term is not specially defined in this specification, the intent is that the term is to be given its plain and ordinary meaning. The accompanying drawings are intended to aid in understanding the present invention and, unless otherwise indicated, are not drawn to scale.

Further, it should be recognized that embodiments of the present invention can be implemented via computer hardware or software, or a combination of both. The methods can be implemented in computer programs using standard programming techniques—including a computer-readable storage medium configured with a computer program, where the storage medium so configured causes a computer to operate in a specific and predefined manner—according to the methods and figures described in this Specification. Each program may be implemented in a high level procedural or object oriented programming language to communicate with a computer system. However, the programs can be implemented in assembly or machine language, if desired. In any case, the language can be a compiled or interpreted language. Moreover, the program can run on dedicated integrated circuits programmed for that purpose.

The scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps. The figures described herein are generally schematic and do not necessarily portray the embodiments of the invention in proper proportion or scale.

The invention claimed is:

1. A fastener covered with a self-sealing coating, said self-sealing coating comprising:
    one or more layers of a one-part moisture-curable sealant; and
    a first layer of a frangible moisture barrier coating covering said one or more layers of one-part curable sealant, such that when the fastener is installed into a pre-drilled hole in a workpiece the frangible moisture barrier will break apart, thereby allowing moisture from a moisture source to reach the sealant so that the sealant will cure and form a seal between the faster and the workpiece, and at least a portion of said moisture barrier coating will be extruded rather than mixing with the portion of the sealant forming the seal between the fastener and the workpiece.

2. The fastener of claim 1 in which the moisture-curable sealant is cure blocked with a moisture removable blocking group.

3. The fastener of claim 1 in which the portion of moisture barrier extruded is greater than 50%.

4. The fastener of claim 1 in which the portion of moisture barrier extruded is greater than 75%.

5. The fastener of claim 1 in which the one-part moisture-curable sealant comprises a thiol-terminated polymer, prepolymer, or oligomer capped with a protecting group where the protecting group is cleaved by moisture, and is an organic and/or an organosilane blocking group.

6. The fastener of claim 1 in which the one-part moisture-curable sealant comprises a thiol-terminated polymer, prepolymer, or oligomer capped with a protecting group where the protecting group is cleaved by moisture, and is an inorganic blocking group.

7. The fastener of claim 1 in which the one-part moisture-curable sealant comprises a thiol-terminated polymer, prepolymer, or oligomer capped with a protecting group where the protecting group is cleaved by moisture, and is an inorganic salt blocking group.

8. The fastener of claim 1 further comprising a coating of a premature cure indicator over said one or more layers of the one-part curable sealant and underneath said layer of a frangible moisture barrier coating, said premature cure indicator changing color when exposed to thiol reactive groups.

9. The fastener of claim 1 in which the moisture source is atmospheric moisture.

10. A fastener covered with a self-sealing coating, said self-sealing coating comprising:
    one or more layers of a one-part moisture-curable sealant;
    one or more layers of a frangible moisture barrier coating on top of said one or more layers of the one-part curable sealant, such that when the fastener is installed the frangible moisture barrier layers will break apart allowing moisture to reach the sealant so that the sealant will cure; and
    in which the frangible moisture barrier coating layers comprise a non-solvent based size coat curable by actinic radiation.

11. The fastener of claim 10 in which the moisture barrier coating is an actinic radiation curable polymer composition comprising: (i) an acid ester; (ii) an acrylic oligomer; (iii) a multi-functional (meth)acrylate monomer; and/or (iv) a layered inorganic silicate, wherein the composition is curable under ambient temperatures and pressures using actinic radiation.

12. The fastener of claim 11 in which the acid ester is either a monofunctional acid ester or a trifunctional acid ester, or a mixture thereof.

13. The fastener of claim 11 in which the acrylic oligomer is selected from the group consisting of: epoxy acrylate, urethane acrylate, polyester acrylate, polyether acrylate, amine modified polyether acrylate, acrylic acrylate, or combination thereof.

14. The fastener of claim 11 in which the multi-functional (meth)acrylate monomer is selected from the group consisting of: 1,12 dodecanediol dimethacrylate; 1,4-butanediol diacrylate; 1,4-butanediol dimethacrylate; 1,6-hexanediol diacrylate; 1,6 hexanediol dimethacrylate; diethylene glycol diacrylate; diethylene glycol dimethacrylate; dipropylene glycol diacrylate; dipropylene glycol dimethacrylate; ethylene glycol diacrylate; ethylene glycol dimethacrylate; polyethylene glycol diacrylate; polyethylene glycol dimethacrylate; 1,3-butylene glycol diacrylate; 1,3-butylene glycol dimethacrylate; neopentyl glycol diacrylate; neopentyl glycol dimethacrylate; cyclohexane dimethanol diacrylate; cyclohexane dimethanol dimethacrylate; ethoxylated bisphenol A diacrylate, trimethylolpropane triacrylate, pentaerythritol triacrylate, pentaerythritol tetraacrylate, and mixtures thereof.

15. The fastener of claim 11 in which the layered silicate is a phyllosilicate selected from the group consisting of: bentonite; vermiculite; montmorillonite; nontronite; beidellite; volkonskoite; hectorite; saponite; sauconite; magadiite; kanyaite; ledikite and mixtures thereof.

16. A method of producing a fastener covered with a self-sealing coating, the method comprising:
  applying one or more layers of a one-part moisture-curable sealant to a fastener; and
  applying a layer of a frangible moisture barrier coating covering said one or more layers of the one-part curable sealant, such that when the fastener is installed into a pre-drilled hole in a workpiece the frangible moisture barrier will break apart, thereby allowing moisture from a moisture source to reach the sealant so that the sealant will cure and form a seal between the fastener and the workpiece, and at least a portion of the frangible moisture barrier will be extruded rather than mixing with the portion of the sealant forming the seal between the fastener and the workpiece.

17. The method of claim 16 in which applying a layer of a frangible moisture barrier coating over said one or more layers of the one-part curable sealant comprises applying a layer of a frangible moisture barrier coating over said one or more layers of the one-part curable sealant and curing the frangible moisture barrier coating using actinic radiation.

18. The method of claim 17 in which curing the frangible moisture barrier coating using actinic radiation includes frangible moisture barrier coating without curing the sealant.

19. The method of claim 16 further comprising, after applying the one or more layers of a one-part moisture-curable sealant to a fastener, applying a coating of a premature cure indicator that changes color when exposed to thiol reactive groups.

20. The method of claim 16 in which the moisture-curable sealant comprises a polysulfide sealant.

21. The method of claim 16 in which the moisture-curable sealant comprises a polythioether sealant.

22. The method of claim 16 in which applying one or more layers of a one-part moisture-curable sealant to the fastener comprises applying the one-part moisture-curable sealant to a fastener having a head and a shank by applying a sufficient volume of said sealant uniformly around the shank of the fastener so that when the fastener is installed into a workpiece a small amount of sealant visibly extrudes completely around the fastener head.

* * * * *